United States Patent [19]

Matsumoto et al.

[11] Patent Number: 4,471,433
[45] Date of Patent: Sep. 11, 1984

[54] BRANCH GUESS TYPE CENTRAL PROCESSING UNIT

[75] Inventors: Yoshihiro Matsumoto, Tokyo; Hajime Kurii, Wako, both of Japan

[73] Assignee: Tokyo Shibaura Denki Kabushiki Kaisha, Kawasaki, Japan

[21] Appl. No.: 554,760

[22] Filed: Nov. 25, 1983

Related U.S. Application Data

[63] Continuation of Ser. No. 253,285, Apr. 13, 1981, abandoned.

[30] Foreign Application Priority Data

Apr. 21, 1980 [JP] Japan ................................ 55-52568

[51] Int. Cl.³ ............................................. G06F 9/00
[52] U.S. Cl. ............................................. 364/200
[58] Field of Search ............................. 364/200, 900

[56] References Cited

U.S. PATENT DOCUMENTS

| | | | |
|---|---|---|---|
| 3,401,376 | 9/1968 | Barnes | 364/200 |
| 3,418,638 | 12/1968 | Anderson et al. | 364/200 |
| 3,644,900 | 2/1972 | Mizoguchi | 364/200 |
| 3,696,340 | 10/1972 | Matsushita | 364/200 |
| 3,793,631 | 2/1974 | Silverstein et al. | 364/200 |
| 4,179,731 | 12/1979 | Yamazaki | 364/200 |
| 4,197,578 | 4/1980 | Wada et al. | 364/200 |
| 4,200,927 | 4/1980 | Hughes et al. | 364/200 |
| 4,210,960 | 7/1980 | Borgenson et al. | 364/200 |
| 4,240,137 | 12/1980 | Matsumoto et al. | 364/200 |
| 4,338,661 | 7/1982 | Tredennick et al. | 364/200 |

OTHER PUBLICATIONS

Datamation, "The IBM 3033: An Inside Look", by W. D. Connors et al., May 1979, pp. 198-218.

Primary Examiner—Jerry Smith
Assistant Examiner—Michael R. Fleming
Attorney, Agent, or Firm—Oblon, Fisher, Spivak, McClelland & Maier

[57] ABSTRACT

In a branch guess type central processing unit of the invention, for executing a branch instruction, a presignalling instruction for designating a branch address is prefetched by an address/prefetch control circuit before the branch instruction is read out from a macroinstruction memory. This presignalling instruction is decoded. The branch address is stored in advance in an A register, a B register, and a C register. A plurality of instructions stored at the locations represented by these addresses are stored in a first instruction register, a second instruction register and a stack before executing the branch instruction. When the branch instructions are executed, the control can be transferred to jumped locations without causing any hazard in the pipeline.

8 Claims, 55 Drawing Figures

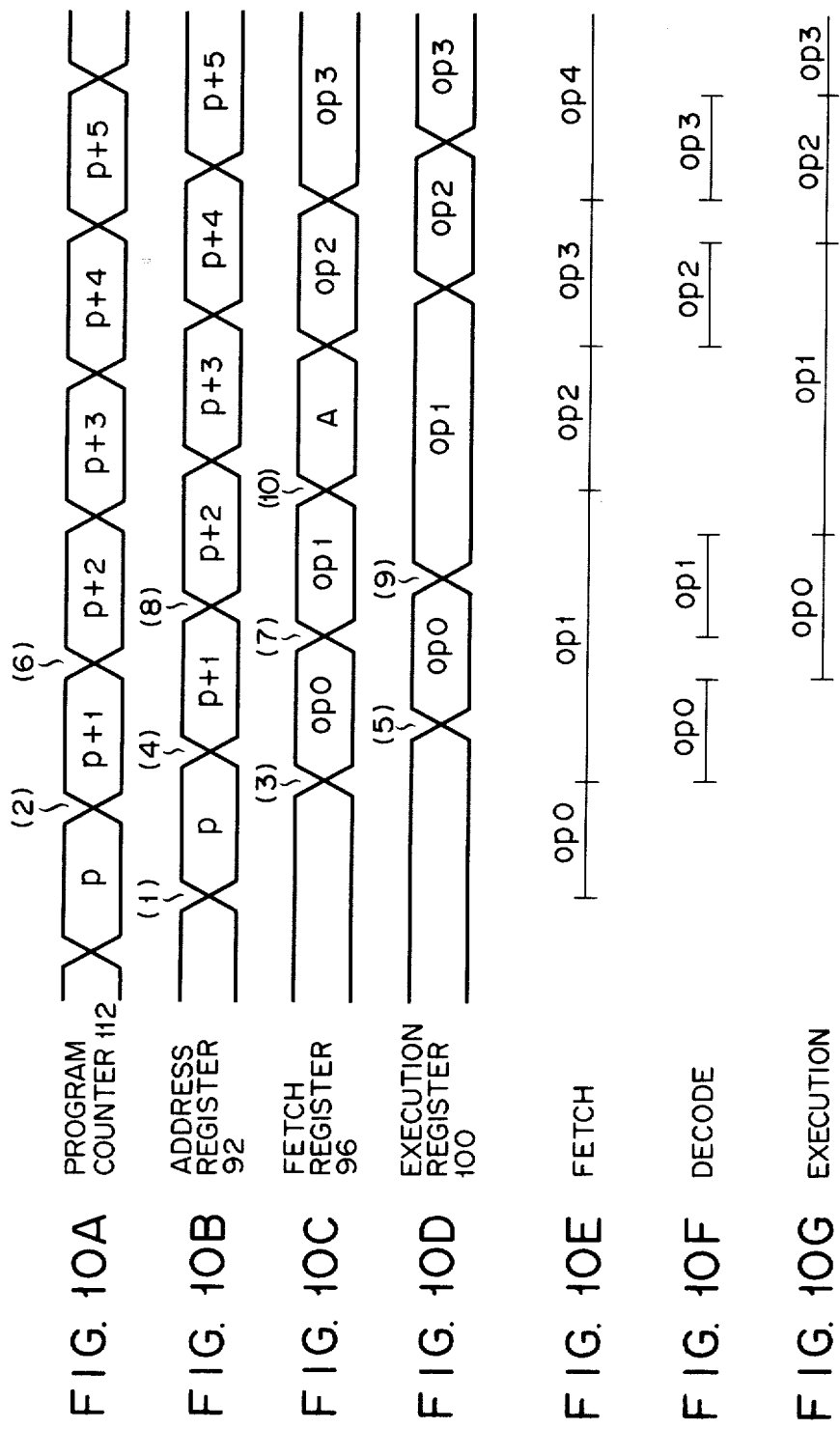

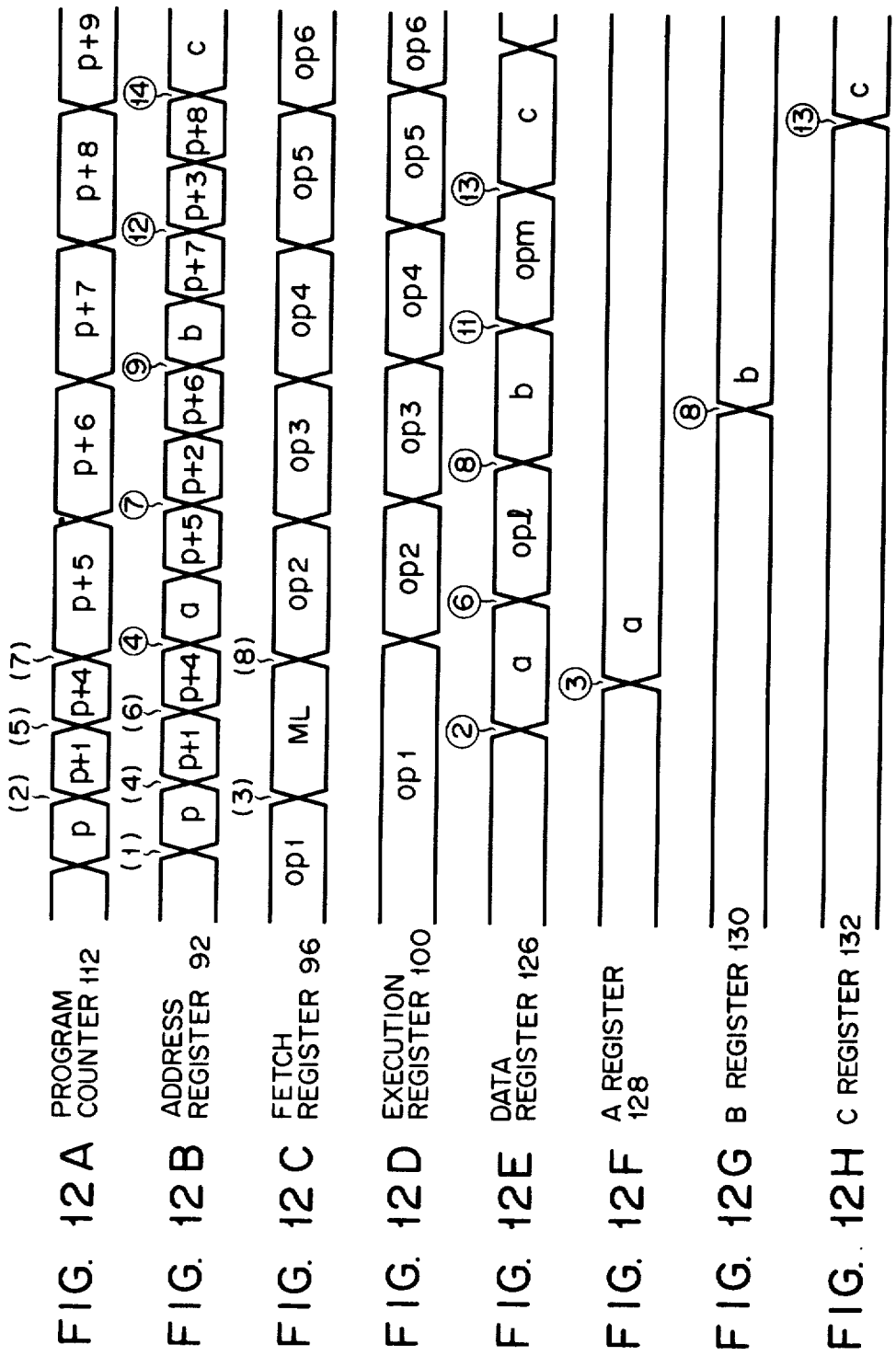

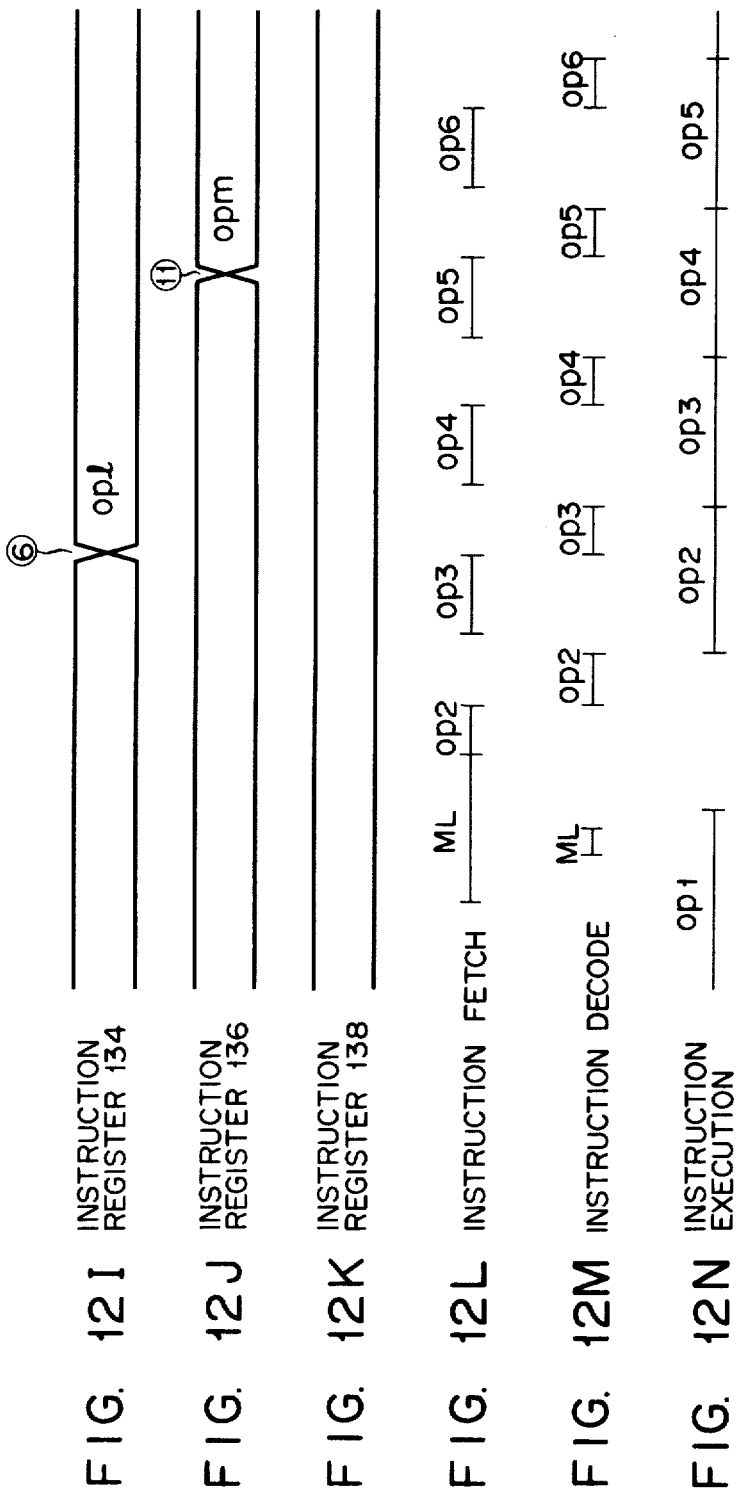

FIG. 15A PROGRAM COUNTER 112

FIG. 15B ADDRESS REGISTER 92

FIG. 15C FETCH REGISTER 96

FIG. 15D EXECUTION REGISTER 100

FIG. 15E A REGISTER 128

FIG. 15F B REGISTER 130

FIG. 15G INSTRUCTION REGISTER 134

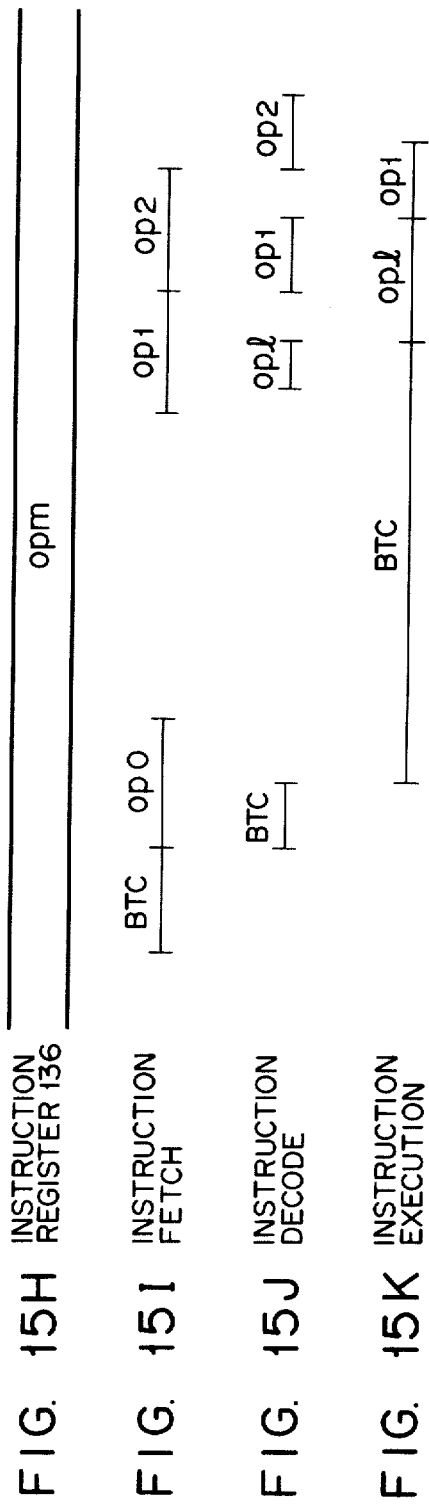

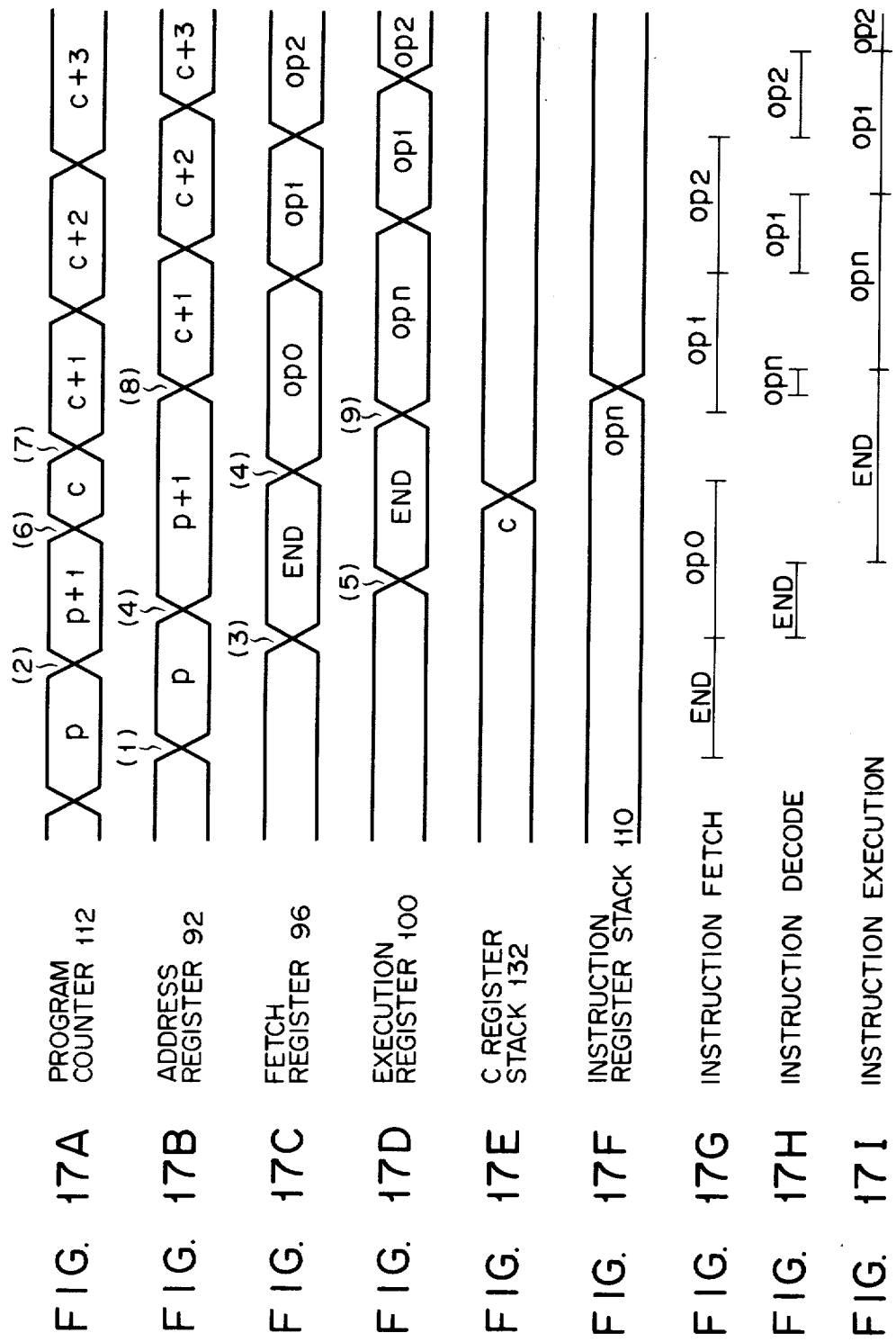

BRANCH GUESS TYPE CENTRAL PROCESSING UNIT

This application is a continuation of application Ser. No. 253,285, filed Apr. 13, 1981 and now abandoned.

BACKGROUND OF THE INVENTION

The present invention relates to a central processing unit for a computer and, more particularly, to a technique for fetching instructions or data required for the operation of the central processing unit from a macroinstruction memory which stores such instructions or data.

The processing speed of a central processing unit (to be referred to as an CPU hereinafter) is generally faster than the fetching speed. Thus, when the quantity of one processing operation of the CPU (the number of bits processed by one execution operation of the CPU) is the same as the quantity of one fetching operation (the number of bits which may be moved from the macroinstruction memory to the CPU by one fetching operation), the total computing speed is lessened by the fetching speed even when the CPU operates at a faster speed. Two methods have been conventionally proposed for overcoming this problem. The first method proposes to make the quantity of one fetching operation of the CPU the same as or larger than the quantity of one processing operation. Expansion of the memory bus width, for example, may be included in this method. However, expansion of the memory bus width is disadvantageous in that the control becomes complex and the cost increases.

The second method proposes to add a memory or a register of small capacity having a fetching speed corresponding to the processing speed of the CPU, and to fetch in advance (to be referred to as prefetching hereinafter) in the added memory (to be referred to as a cache memory) or the register the macroinstruction or data which is to be processed by the CPU.

This second method may further be classified into the cache memory system and the pipeline register system. Since the cache memory is expensive, the cache memory system presents a problem of cost with small computer systems. The present invention concerns the pipeline register system within the prefetching system.

The conventional prefetching system may be classified into the following:

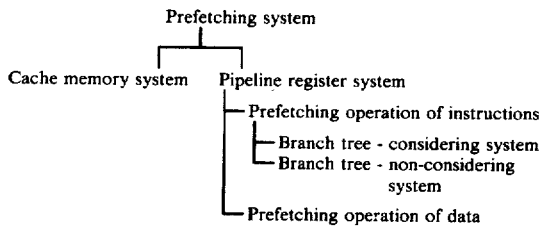

Since the prefetching operation of the data in the cache memory system and the pipeline register system is not directly related to the present invention, the description thereof will be omitted. The present invention thus relates to the branch tree-considering system for performing the prefetching operation of instructions in the pipeline register system. When a judge instruction is included in the instruction sequence, the instruction sequence to follow is branched into a plurality of parts called the branch tree. When the judge instruction is executed, one branch tree is selected according to the judgement and the other branch trees become unnecessary. According to the branch tree-considering system, all the branch trees after the judge instruction are prefetched. According to the branch tree-non-considering system, only one branch tree is prefetched.

According to the latter method, when the prefetched branch tree is not the one which is required, another branch tree must be fetched, reducing the prefetching effects. Although the branch tree-considering system is used for large computers, the non-considering system is usually used for medium or smaller computers due to cost limitations.

The general method for performing the pipeline control will be described. The term "pipeline" means a vertical series of logic units Li (where $i = 1, 2, \ldots, n$) of processing time t. The pipeline control is a processing system according to which data (including instructions) are sequentially supplied from the input terminal and obtained from the output terminal at each time interval t after being processed in n stages by the Lis. In order to operate at a high speed, it is necessary to perform parallel processing of instructions by overlapping the processing steps as shown in FIG. 1. This is called the pipeline control system. Referring to this figure, symbol L1 denotes a reading step of an instruction; L2, a decoding step of the instruction; L3, an address computing step; L4, an operand reading step; and L5, an instruction executing step.

The arithmetic and logic unit for the pipeline control may be generally represented as shown in FIG. 2. The functional relationships of these units are shown in FIG. 3. The operation procedures in this figure are as follows:

(1) An instruction readout request is output from a unit P to a unit B.

(2) If the requested instruction is present in a buffer memory (BM), the unit B sends it to the unit P. If it is not present there, the unit B outputs a request to a unit F and sends the requested instruction to the unit P.

(3) The unit P decodes the instruction and outputs a request for the address computation of the operand to a unit A.

(4) The address is sent from the unit A to the unit B to read out the operand.

(5) The unit P outputs an operation instruction to the unit E.

(6) The operation result is stored in a main memory through the Unit B or F according to the instruction from the unit E.

The flow of the above procedures may be represented by the detailed block diagram of FIG. 4. The operations in this figure are as follows:

1. Readout of Instruction

The content of a program counter 10 is set in an address register 12, and a main memory (buffer memory) 14 is accessed (routes 2, 4) based on this address. The instruction output from the main memory (buffer memory) 14 is set in an instruction register 18 through a memory register (MR) 16 (routes 6, 8).

2. Address Computation of Second Operand

The content of a general register 20 is loaded in one address register 22 (AR1), and the content of the instruction register 18 is loaded in another address register 24 (AR2). The contents of 22 (AR1) and 24 (AR2)

are input to an address computing unit 26 for address computation, and the computation result is output to an address register 28 (AR3) (routes 30, 32, 34).

3. Readout of Second Operand from Memory

The content of the address register 28 (AR3) is loaded in the address register 12. The output of the address register 12 is input to the main memory (buffer memory) 14 which then outputs it through the memory register 16 to a second operand register 36 (OR2) (routes 38, 40, 42, 44).

4. Control of Instruction Execution

The output of the instruction register 18 is input to an instruction decoder 46 for providing various control signals for executing the instruction (route 48).

5. Readout of First Operand

The first operand from the general register 20 is loaded in a first operand register 50 (OR1) (route 52).

6. Operation

The contents of the first and second operand registers 50 (OR1) and 36 (OR2) are input to an arithmetic logic unit (ALU) 54 for operation, and the operation result is output to a third operand register 56 (OR3) (routes 58, 60, 62).

7. Storing of Operation Result

The content of the third operand register 56 (OR3) is stored in the general register 20 or in the main memory (buffer memory) 14 through the memory register 16 (routes 64, 66, 68).

Thus, a single instruction is executed through several units. However, with the pipeline control system, instructions are sequentially input to one unit. If the processing time of each unit is the same, an ideal pipeline may be established. However, since there are various complex processing procedures involved in the actual processing, so called "idle processing segment" will appear. This is caused when, for example, we have a conditional jump instruction. Thus, the incorporation of buffer registers in several units has been proposed. This is to regulate the output of the information by temporarily storing the information in the pipeline even when the input data is not regular. As for the use of the buffer registers, in the unit E (Execution Control) are incorporated, as shown in FIG. 5, an operation stack register (OSR) 68 for storing four operations and an operand buffer register (OBR) 72 for storing four pieces of data. This mechanism is adopted for the purpose of eliminating idle time within the pipeline when time-consuming operations are required or consecutive data are output from the memory.

Five instruction buffer registers are incorporated in the unit P (Program Control) of FIG. 6. They include buffer registers for reading out the farthest possible instruction in the flow of instruction which is currently executed (normal sequence) and buffer registers for reading out the instruction at the jump address (branch address sequence) when a jump instruction is input. Among the five buffer registers (74, 76, 78, 80, 82), two (76, 78) are for the normal sequence, two (80, 82) are for branch address sequence, and the remaining one (74) is for temporarily storing the fetch instruction when it is output from the buffer memory and the required buffer register is in use. A large computer which performs pipeline control conventionally performs complex control using much hardware.

SUMMARY OF THE INVENTION

It is an object of the present invention to provide a central processing unit which adopts a simplified prefetching system so that the branch tree-considering system may be adopted in small computers or microcomputers.

In order to accomplish this object, the present invention provides a branch guess type central processing unit which judges the conditions of given data to select an instruction to be executed next, and which executes a branch instruction leading to a branch address, characterized by comprising:

(A) means for storing said branch address;

(B) means for storing an instruction of said branch address;

(C) means for detecting an instruction for setting a plurality of addresses corresponding to said judging conditions in said address storing means; and (D) control means for setting said plurality of addresses in said address storing means before execution of said branch instruction in response to a control signal from said detecting means, and for setting said plurality of instructions stored at locations designated by said plurality of addresses in said instruction storing means before execution of said branch instruction.

In the branch guess type central processing unit according to the present invention, an instruction of the branch address is prefetched to a register before an instruction for setting the branch address corresponding to the branch conditions is decoded and the branch instruction is executed. Due to this construction, a central processing unit of the pipeline register system may be obtained with which the control is easy. Furthermore, since the control is simple, the number of logic elements and circuits may be reduced, also reducing the manufacturing cost.

BRIEF DESCRIPTION OF THE DRAWINGS

Other objects and features of the present invention will be apparent from the following description when taken in conjunction with the accompanying drawings in which:

FIGS. 10A to 10G are timing charts of when the macroinstructions shown in FIG. 9 are sequentially executed;

FIGS. 12A to 12N are timing charts showing the prefetching procedure of the values of the first, second and third operands when the ML instruction shown in FIG. 11 is executed, and also showing the timings of the macroinstruction group following the ML instruction executed parallel to this prefetching operation;

FIGS. 15A to 15K are timing charts showing the timings when the BTC instruction shown in FIG. 14 is executed;

FIGS. 17A to 17I are timing charts showing the timing when the END instruction shown in FIG. 16 is executed.

DETAILED DESCRIPTION OF THE PREFERRED EMBODIMENTS

Figures 1, 2:
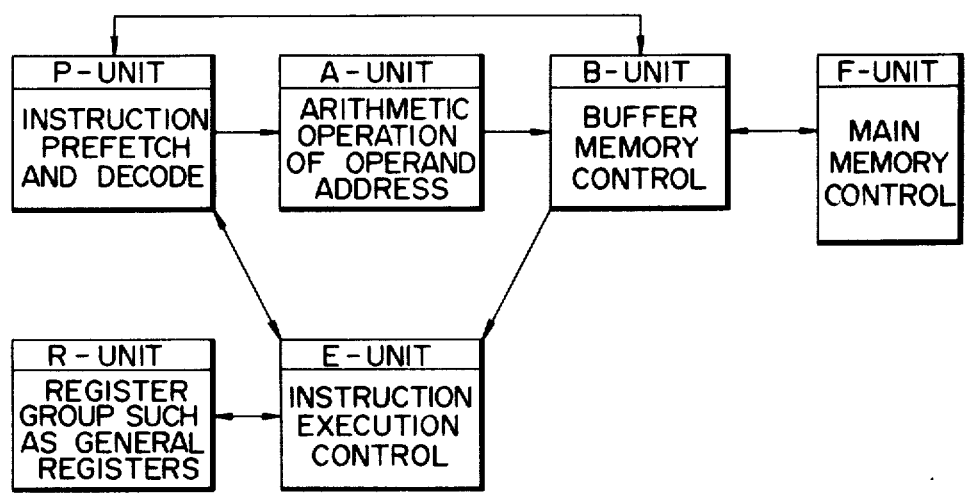
FIG. 1 is a view for illustrating ideal pipeline control according to the prior art.
FIG. 2 is a block diagram illustrating pipeline control in the prior art.
Figure 3:
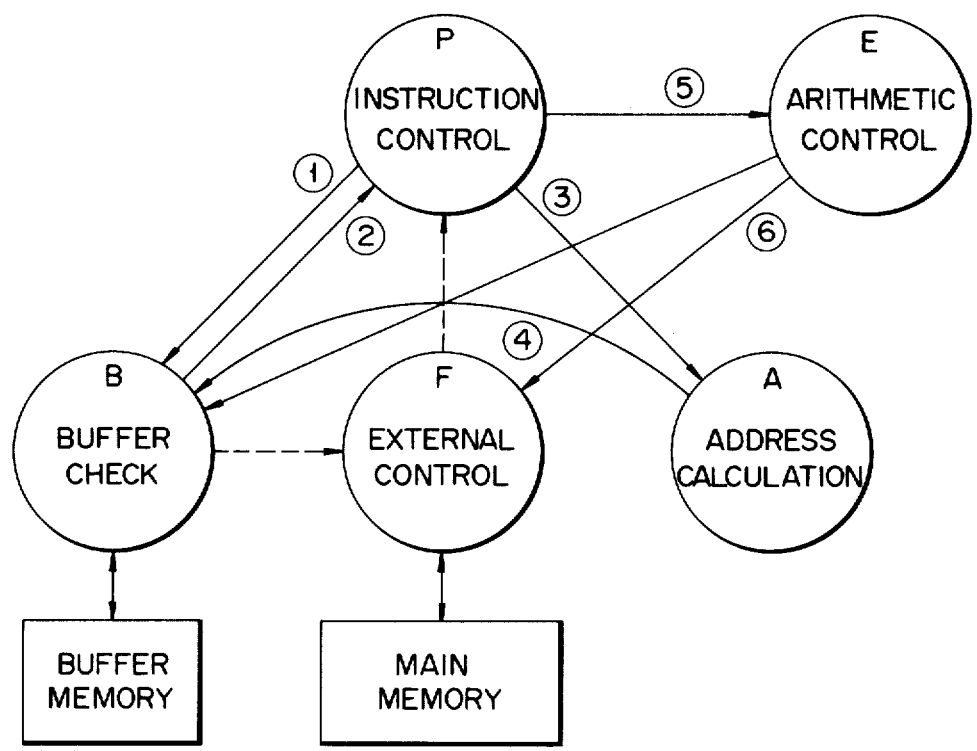
FIG. 3 is a functional diagram explaining the operations of each unit in FIG. 2.
Figure 4:
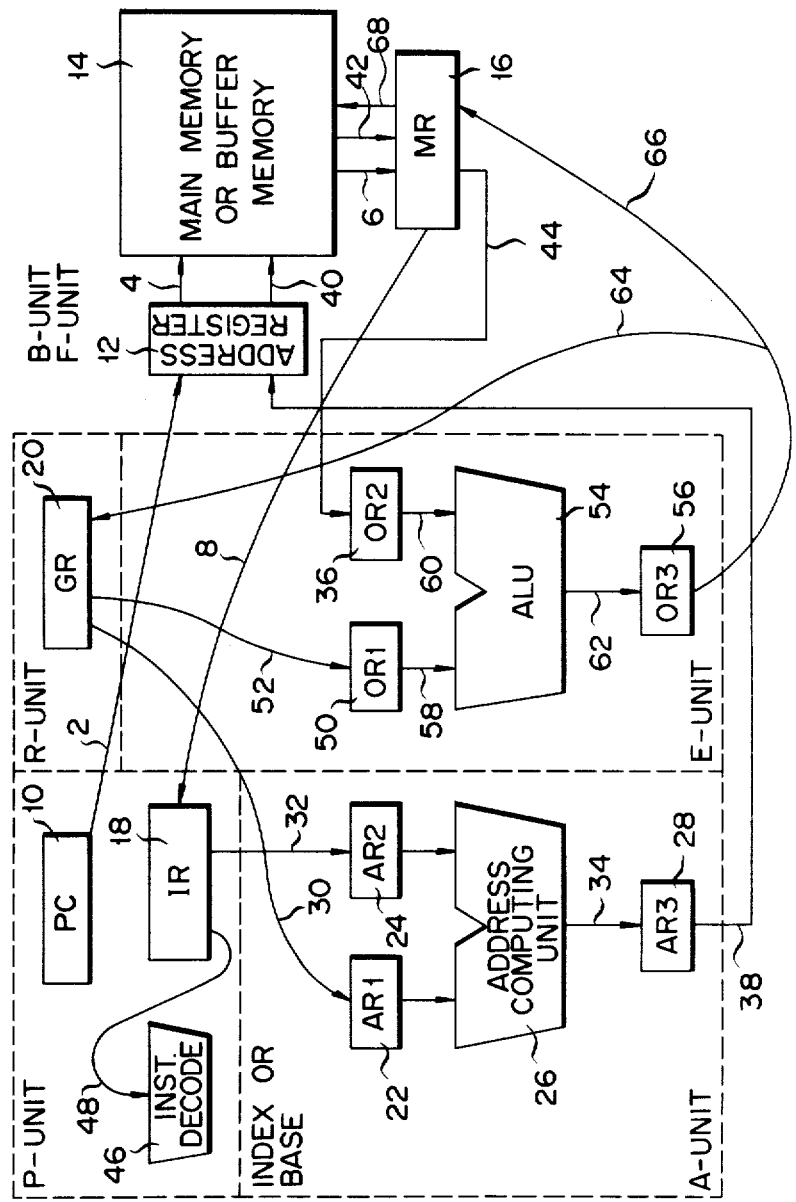
FIG. 4 is a functional block diagram explaining the execution flow of an instruction in a central processing unit with pipeline control according to the prior art.
Figure 5:
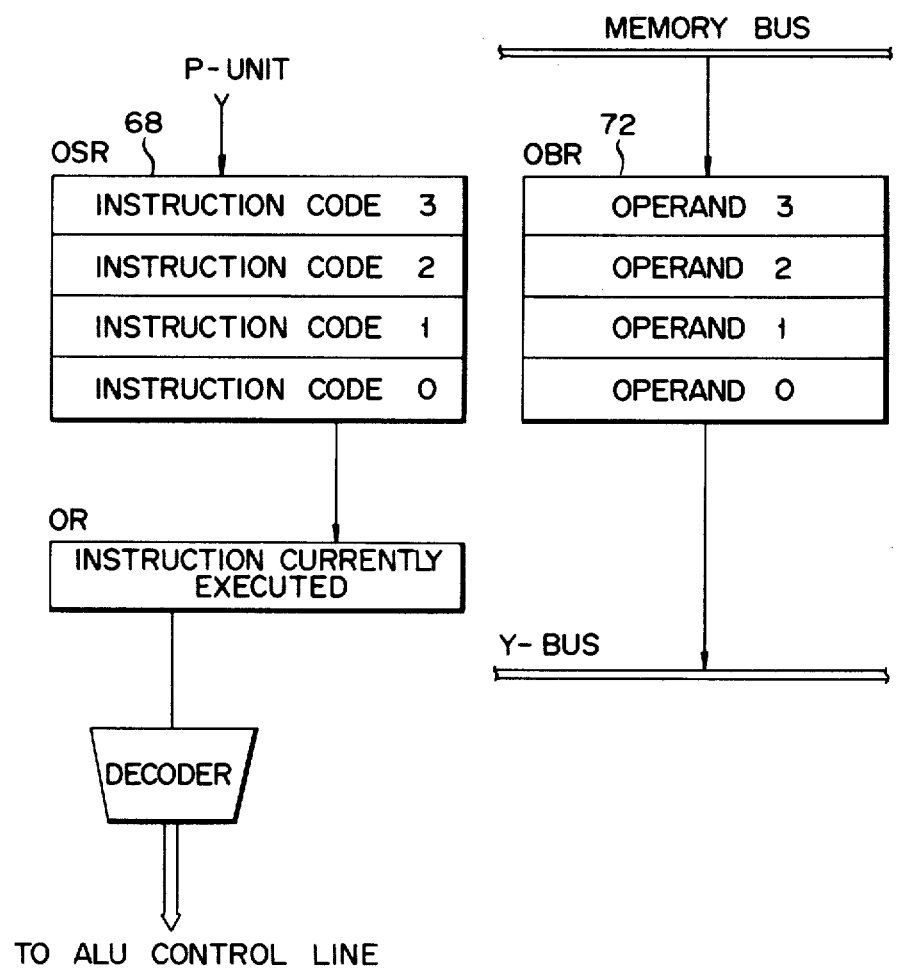
FIG. 5 is a schematic diagram illustrating the buffer construction of the unit E shown in FIG. 4.
Figure 6:
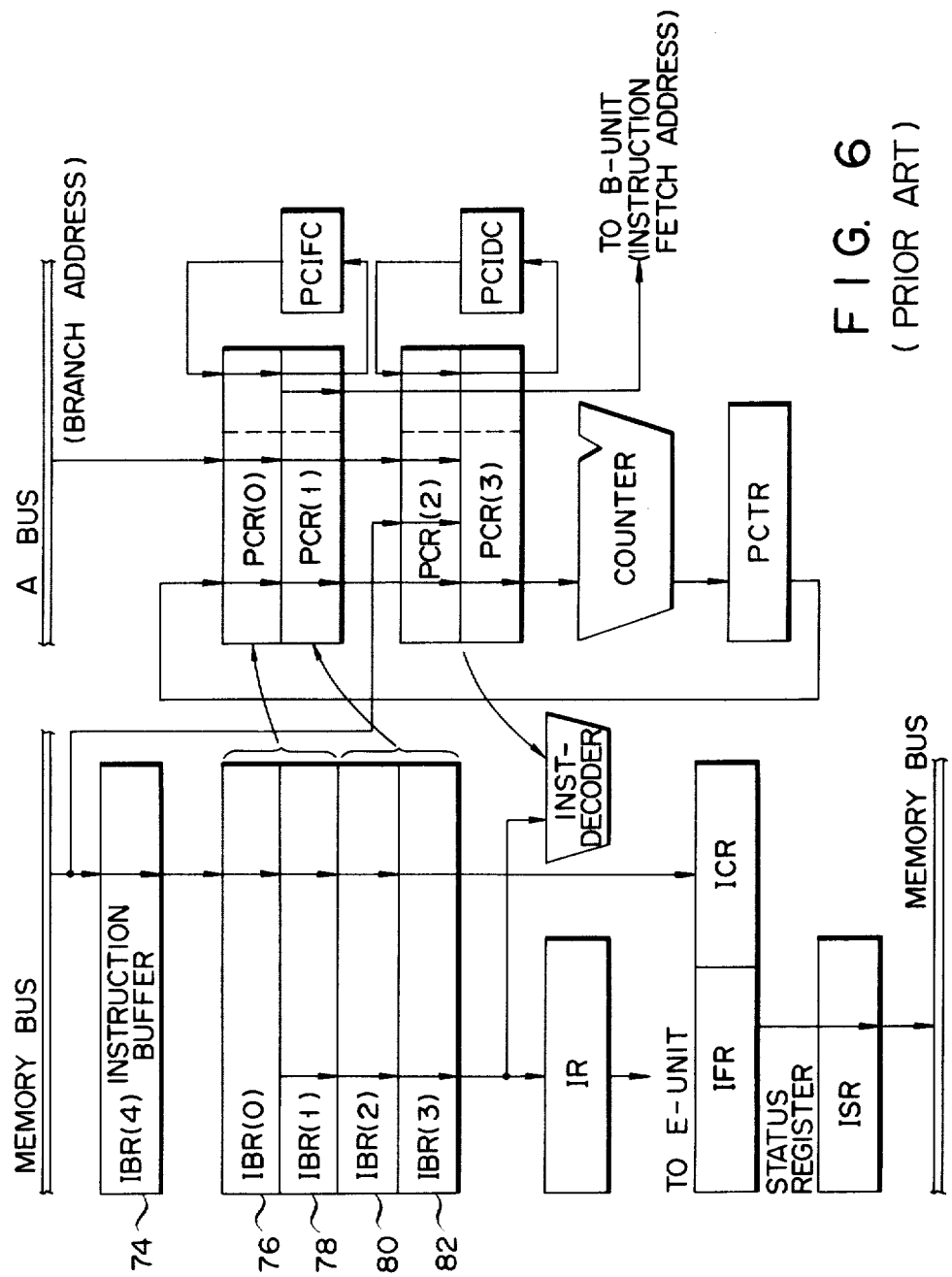
FIG. 6 shows the construction of the unit P of FIG. 4.
Figure 7:
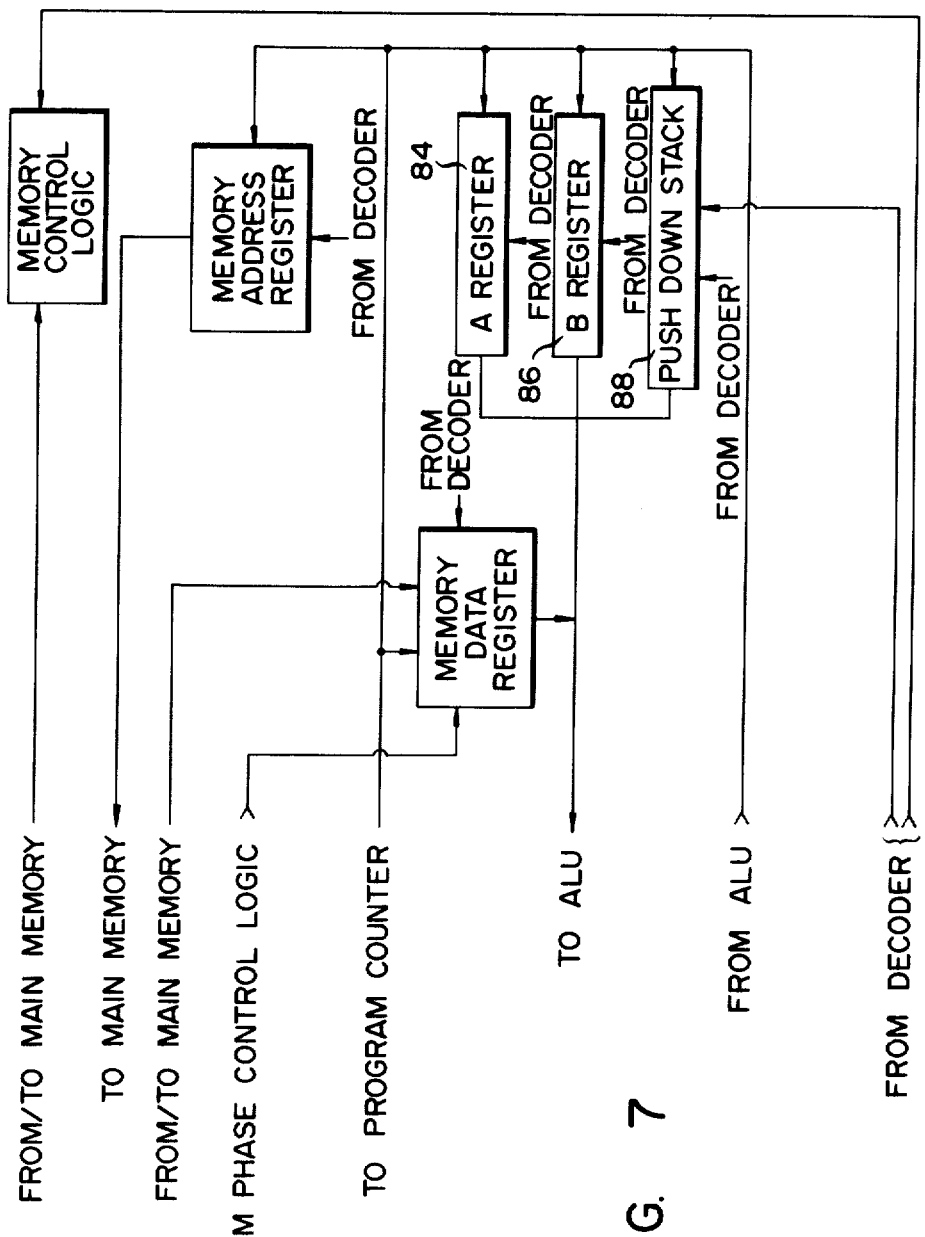
FIG. 7 is a hardware block diagram of a central processing unit from a related application for explaining the instruction used in the present invention.

Before describing the construction of an embodiment of the present invention, a macroinstruction group used in a computing system incorporating this construction will be described. Although the macroinstruction group is described in detail in the U.S. Pat. No. 4,240,137 of the same applicant, it will be briefly described referring to FIG. 7. The purpose of this is to provide a central processing unit which is capable of truly efficiently executing structured programs at the level of machine language by adding to the conventional central processing unit shown in FIG. 7 a pushdown stack 88 and two kinds of registers for storing the branch address, an A register 84 and a B register 86, and by further incorporating a circuit with which control of these elements is easy. In order to accomplish this purpose, the unit has means for providing four instructions:

(1) means for designating a predetermined address from the program counter to read out data (A, B, C) which are the executing initial addresses of the first, second and third blocks of the program stored in the main memory, and for providing an instruction (ML instruction) for storing these data in the first register (A register), the second register (B register), and the pushdown stack;

(2) means for providing a true-false check instruction (BTC or BFC instruction) for selectively storing the content of the first register or the second register in the program counter according to the operation result; and (3) means for popping up the pushdown stack to provide an instruction (END instruction) for storing its content in the program counter.

(4) means for popping up the push down stack to provide an instruction (LOOP OUT instruction) for discarding its content.

These instructions are executed by microprograms and the circuit mentioned hereinabove.

A description will now be made with reference to a group of four macroinstructions:

[1] ML A, B, C

[2] BTC M(0), M(1), M(2), M(3)
   BFC M(0), M(1), M(2), M(3)

[3] END

[4] LOOP OUT

[1] ML A, B, C

The content of the address A is stored in the A register.

The content of the address B is stored in the B register.

The content of the address C is added to the fast in, last out type stack C.

[2] BTC M(0), M(1), M(2), M(3)

When the value of the condition F is 1, a branch is made to the address of the value stored in the A register.

When the value of the condition F is not 1, a branch is made to the address of the value stored in the B register.

The condition F is such that $$F=((M(0) \wedge C) \vee (M(1) \wedge V)(M(2) \wedge N) \vee (M(3) \wedge Z)$$

where the values of C, V, N, and Z are obtained for the operation results in the ALU immediately before the BTC or BFC instruction; symbol $\wedge$ means AND; symbol $\vee$ means OR; C is a carry flag; V, an overflow flag; N, a negative flag; and Z, a zero flag.

BFC M(0), M(1), M(2), M(3)

When the value of the condition F is 0, a branch is made to the address of the value stored in the A register.

[3] END

A fast in, last out type stack C is popped up.

The obtained value is transferred to the program counter and the program is branched to the address of this value.

[4] LOOP OUT

A first in, last out type stack C is popped up but the obtained value is not used. The program counter is imcremented and the program is executed sequentially.

Several sets of instructions for providing the judging conditions are necessarily included before the BTC and BFC instructions. The ML instruction must be inserted before these instructions. Thus, by executing the ML instruction and several instructions before the judge instruction such as the BTC or BFC instruction, it is possible to input to the central processing unit, before the execution of the BTC or BFC instruction, two addresses (A and B) to branch after the execution of the judge instruction and a return address (C) for returning to the original instruction sequence.

The instruction for the purpose of presignalling need not be ML A, B, C as described above. Various other modified types of presignalling instructions are possible. The instruction ML A, B, C are adopted in this embodiment as the typical ones among the various presignalling instructions. When the instruction ML A, B, C are implemented by the microprogram, the judge instructions to follow are simplified as in the case of the BTC or BFC instruction. Since the conventional judge instructions needed to include the branch addresses such as A and B, the judge instructions required a long bit pattern. The employment of the instruction ML A, B, C in the present invention does not directly result in an increase in the macroinstruction memory size. A simple program will be considered to clearly show the functions of the ML instruction, BTC instruction, the BFC instruction, and the END instruction. A program will be considered which compares two numbers and obtains the smaller one. It is assumed that the two numbers are stored in the memory locations having the addresses P and Q, and the smaller number is stored in the memory location having the address MIN.

The program described below applies to conventional instructions:

| Program-1 | | |
|---|---|---|
| | LH 3, P | One number is loaded in the register 3. |
| | SH 3, Q | The other number is subtracted from the above number. |
| | BM A | When the result is negative, a jump is made to the address A. |
| B | LH 3, Q | The smaller number is loaded in the register 3. |
| | B C | A jump is made to the address C. |
| A | LH 3, P | The smaller number is loaded in the register 3. |
| | B, C | A jump is made to the address C. |
| C | STH 3, MIN | The smaller number is stored in the address MIN. |

The program may be rewritten as follows using the ML instruction, the BTC instruction, the BFC instruction, and the END instruction.

| Program-2 | | |
|---|---|---|
| | ML A, B, C | Branch address presignalling instruction |
| | LH 3, P | One number is loaded in the register 3. |
| | SH 3, P | The other number is subtracted from the above number. |
| | BTC 0, 0, 1, 0 | A jump is made to the address A when the negative flag is true and to the address B when the negative flag is false. |
| A | LH 3, P | A jump is made to the branch address for the case of true. |
| | END | A jump is made to the address C. |
| B | LH 3, Q | A jump is made to the branch address C for the case of false. |
| C | STH 3, MIN | The smaller number is stored in the address MIN. |

As may be seen from the above example, the memory capacity required for Program-1, that is, when the programming is performed with conventional macroinstructions, is 32 bytes. The memory capacity when programming is performed with the ML instruction, the BTC instruction, the BFC instruction, and the END instruction is 34 bytes. Thus, although 2 extra bytes are required in the macroinstructions used in the present invention, an increase of this degree is practically negligible when considering the cost reduction of the IC memory due to the recent improvements in integration density.

Figure 8A:
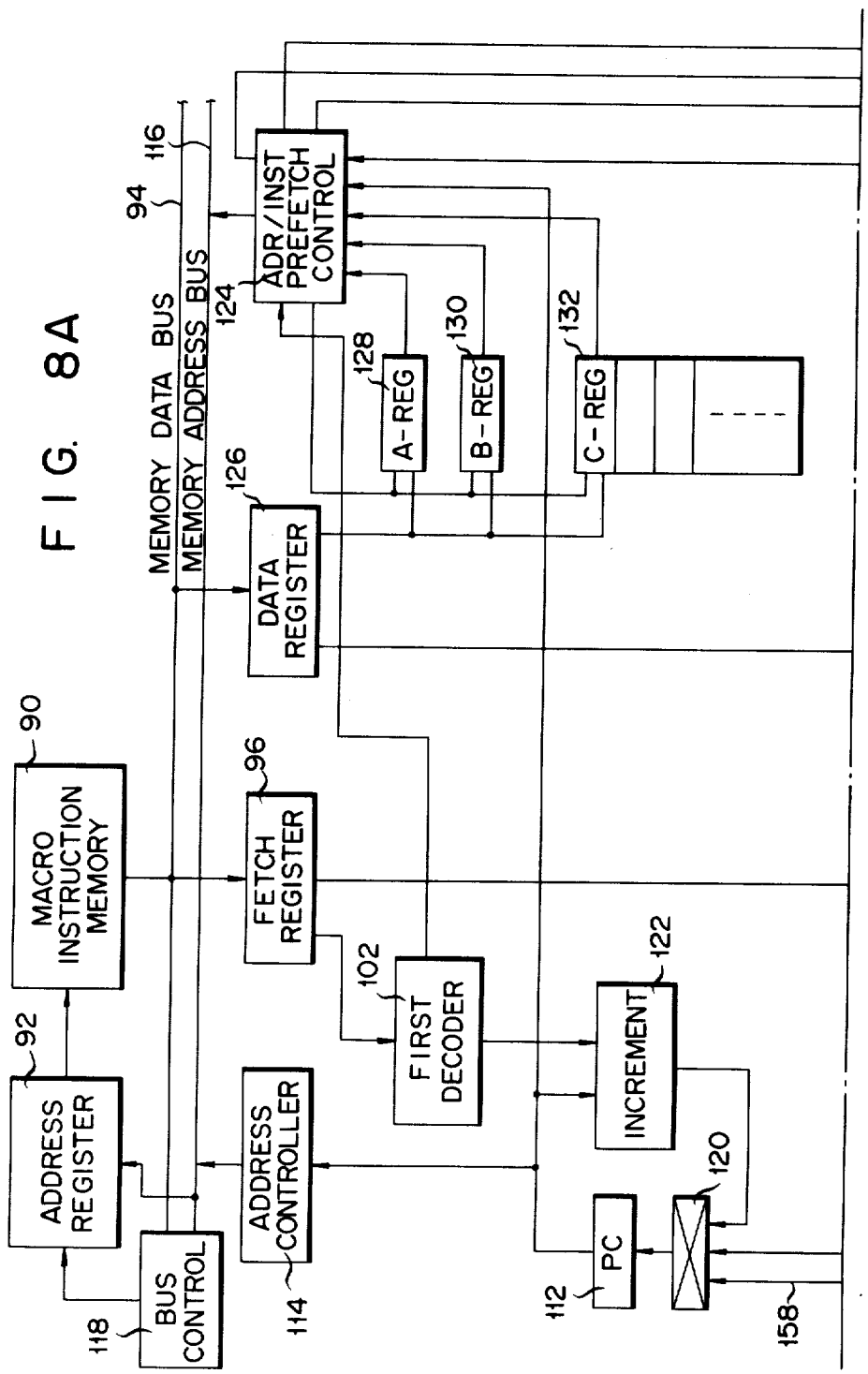
FIGS. 8A and 8B are block diagrams illustrating a central processing unit according to an embodiment of the present invention.
Figure 8B:
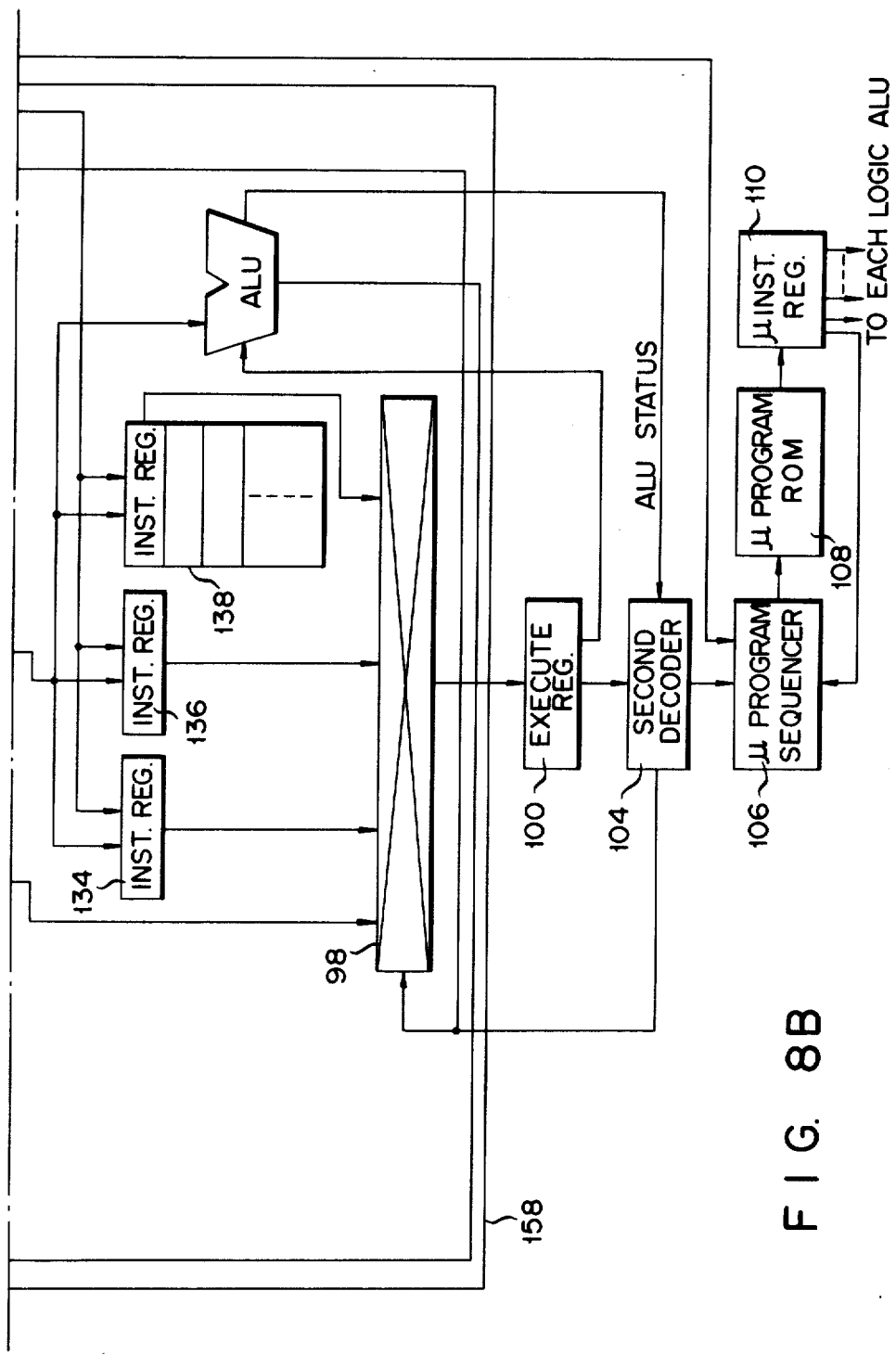

FIG. 8 shows an embodiment of the present invention. The instructions used by the user will be referred to as macroinstructions to differentiate them from the microinstructions.

The macroinstructions and the related data are stored in a macroinstruction memory 90. A macroinstruction stored in the address set by an address register 92 is fetched to a fetch register 96 through a memory data bus 94 and is thereafter fetched to an executing register 100 through a selector 98. The fetching operation of the macroinstruction to the fetch register 96 is performed parallel to the fetching operation of the macroinstruction to the executing register 100 for operating the ALU (the fetch register 96 and the executing register 100 in combination may be referred to as a pipeline register). The instruction read out to the fetch register 96 from the macroinstruction memory 90 is supplied to a first decoder 102. The first decoder 102 checks whether the macroinstruction supplied is an ML instruction. If it is not an ML instruction, the content of the fetch register 96 is held until execution of the executing register 100 is completed. After the content of the executing register 100 is processed by the ALU, the content of the fetch register 96 is transferred to the executing register 100 and is decoded by a second decoder 104. Based on the decoded result of the second decoder 104, a microprogram sequencer 106 controls the execution of the microprogram stored in a microprogram ROM 108. The microinstruction output from the microgrogram ROM 108 is loaded in an microinstruction register 110 and distributes the control signal to the ALU or respective parts of the logic circuit according to the instruction from the microprogram sequencer 106. The location address in the macroinstruction memory 90 of the instruction fetched to the fetch register 96 is designated by the address register 92. Thus, the address value set in a program counter 112 is output on a memory address bus 116 through an address controller 114. A bus controller 118 supplies the address value output on the memory address bus 116 to the address register 92. The program counter 112 is incremented in unitary increments each time the content of the fetch register 96 is sent to the executing register 100 unless a branch instruction is supplied. When the branch instruction is executed by the DPU, the branch address is supplied from the ALU to the program counter 112 through a selector 120.

When the first decoder 102 judges that the instruction is an ML instruction, an incrementer 122 increments the contents of the program counter 112 by 3 according to an instruction from the first decoder 102. The macroinstruction memory 90 has 1-byte (8 bits) memory units, and the instructions or data are stored in these units. When it is assumed that the address value consists of 8 bits and the operation code of the instruction also consists of 8 bits, the ML A, B, C instruction consists of 4 bytes. In the above case, the operation code of the above ML instruction is not supplied to the executing register 100. An address/instruction prefetch control circuit 124 instructs the bus controller 118 to read out operands of the ML instruction by the instruction from the first decoder 102. The bus controller 118 reads out the operands A, B and C of the ML instruction from the macroinstruction memory 90 and loads them in an A register 128, a B register 130 and a C register stack 132, respectively, through a data register 126. The C register stack 132 is a first in, last out stack. The address/instruction prefetch control circuit 124 reads out the contents of the location of the macroinstruction memory 90 defined by the address stored in the A register 128, the B register 130, and the C register stack 132 and loads them in an instruction register 134, an instruction register 136, and an instruction register stack 138 through the data register 126. The instruction register stack 138 is of the first in, last out system as in the case of the C register stack 132.

When the judge instruction (BTC instruction, BFC instruction) always present after the ML instruction is executed in the manner described above, the instruction of the branch address is prepared in the instruction registers 134 and 136, and the instruction of the return address is prepared in the instruction register stack 138. This prefetching operation is performed while the two instructions, the ML instruction and the BTC instruction are being executed in the example of Program-2. In the example of Program-2, LH is loaded in the instruction registers 134 and 136, and STH is loaded in the instruction register stack 138. The values of the operands A, B, C are loaded in the A register 128, the B register 130, and the C register stack 132, respectively. When the judge instruction (BTC instruction, BFC instruction) is executed, either of the instruction registers 134 and 136 is selected by the selector 98 and is loaded in the executing register 100. When the instruction register 134 is selected, for example, its content is loaded in the executing register 100. Simultaneously with this, the content of the A register 128 is loaded in the program counter 112 through the address/instruction prefetch control circuit 124 and the selector 120 and is incremented by 1. This value becomes the next address for fetching from the macroinstruction memory 90. When the END instruction is executed by the CPU, the content of the fetch register 96 is not loaded in the executing register 100; instead, the instruction register stack 138 is popped up and the obtained content is loaded in the execution register 100. At this time, the content of the fetch register 96 is disregarded. The content obtained by popping up the C register stack 132 is loaded in the program counter 112 to increment it by 1.

The executing procedure of the macroinstruction in the central processing unit of the present invention will now be described.

Figure 9:
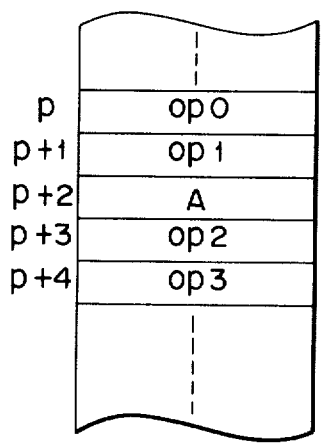
FIG. 9 is a memory map for macroinstructions written in the macroinstruction memory shown in FIGS. 8A and 8B.

As shown in the memory map of FIG. 9, it is assumed that a 1-byte instruction OP0 is written in address P of the macroinstruction memory 90; a 2-byte instruction OP1 is written in addresses P+1 and P+2; and 1-byte instructions OP2 and OP3 are written in addresses P+3 and P+4. The procedure for executing the macroinstruction in this case is as follows:

(1) A request for reading out the macroinstruction OP0 is output during the execution of the macroinstruction which is one step before the macroinstruction OP0. That is, the content of the program counter 112 is sent to the address register 92 through the memory address bus 116 to output a memory readout request.

(2) The content of the program coutner 112 is incremented by 1 (P+1) by the incrementer 122 and is held by the program counter 112 through the selector 120.

(3) The macroinstruction OP0 which is read-requested in the step 1 is read out from the macroinstruction memory 90 and is held in the fetch register 96 through the memory data bus 94. The macroinstruction held in the fetch register 96 is decoded by the decoder 102 and is checked to determine if it is an ML instruction.

(4) The content (P+1) of the program counter 112 is transferred to the address register 92 and a readout request for the next instruction is output.

(5) When the instruction is judged to be an instruction other than the ML instruction in step (3), the content of the fetch register 96 is transferred to the executing register 100 through the selector 98. The content of the executing register 100 is decoded by the decoder 104, and creates an initial address of the microprogram particular to the macroinstruction OP0. This initial address is supplied to the microprogram sequencer 106.

(6) Step (2) is repeated for (P+2).

(7) The data which is read-requested in step (4), that is, the macroinstruction OP1, is held in the fetch register 96.

(8) Step (4) is repeated.

(9) The execution of the macroinstruction OP0 is completed. The next macroinstruction OP1 is transferred to the executing register 100 to be executed.

(10) The data which is read-requested in the step (8), that is, the operand of the macroinstruction OP1, is held in the fetch register 96. This value is sent to the ALU to be used for the operation of the macroinstruction OP1.

The executing procedure of the ML instruction will be described next.

Figure 11:
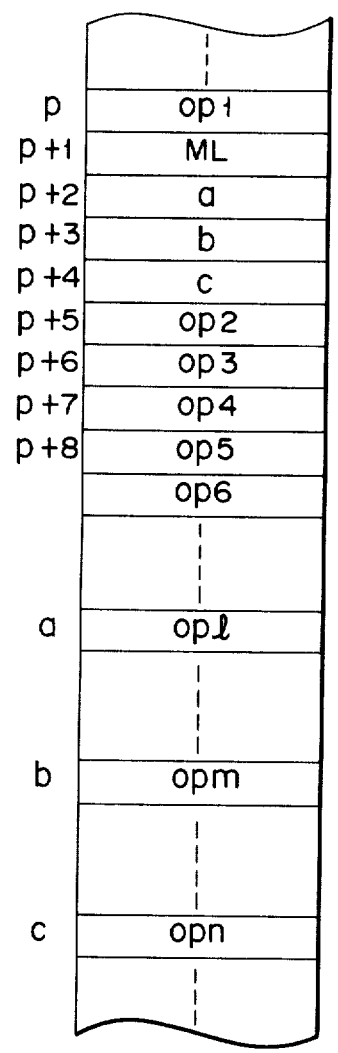
FIG. 11 is a memory map representing the ML instruction written in the macroinstruction memory.

As may be shown by the memory map in FIG. 11, it is assumed that the ML instruction is written from the address P of the macroinstruction memory 90; and macroinstructions OP1, OPm, and OPn are written in addresses a, b and c represented by the first, second and third operands of the ML instruction. It is further assumed that macroinstructions OP2, OP3, OP4, . . . following the ML instruction are sequentially executed after the P+4 address. The above execution procedure will be described in detail referring to the timing charts shown in FIGS. 12a to 12m wherein the macroinstructions are written in the above-mentioned manner.

(1) A readout request of the ML instruction is output during the execution of the macroinstruction executed before the ML instruction. That is, the content (P) of the program counter 112 is transferred to the address register 92 and the readout request of the memory is output.

(2) The content (P) of the program counter 112 is incremented by 1 (P+1) by the incrementer 122 and is held in the program counter 112 through the selector 120.

(3) The data requested in the step (1) is read out from the macroinstruction memory 90 and is held in the fetch register 96 through the memory data bus 94. The data held in the fetch register 96 is decoded by the decoder 102 and is checked to determine whether it is an ML instruction or not. It it is judged to be an ML instruction, a start request is output to the address/instruction prefetch control circuit 124. (The operation of the address/instruction prefetch control circuit after the start request will be described hereinafter.)

(4) The content (P+1) of the program counter 112 is transferred to the address register 92 and a readout request for the next data is performed.

The value a (the first operand of the ML instruction) read out from the macroinstruction memory 90 is held in the data register 126 by the function of the address-/instruction prefetch control circuit 124.

(5) When the data is judged to be an ML instruction in the step (3), the content of the program counter 112 is incremented by 3 by the incrementer 122 to become (P+4), whereupon the address designated by the program counter 112 becomes the next macroinstruction OP2 of the ML instruction.

(6) In order to read out the macroinstruction OP2, the content of the program counter 112 is transferred to the address register 92 and the memory readout request is performed. Since the readout of the second and third operands of the ML instruction is performed by the address/instruction prefetch control circuit 124, this processing is not performed here.

(7) Step (2) is repeated.

(8) The data requested by the macroinstruction memory 90 in the step (6) is held in the fetch register 96 through the memory data bus 94. The new macroinstruction OP2 held at the fetch register 96 is decoded by the first decoder 102 in a manner similar to that in step (3) to determine if it is an ML instruction.

(9) The macroinstruction OP2 held in the fetch register 96 is held in the executing register 100. The content of the executing register 100 changes from the preceding instruction of the ML instruction to the macroinstruction OP2, and the instruction itself is not held in the executing register 100.

The address/instruction prefetch control circuit 124 for performing the ML instruction will now be described.

Figure 13:
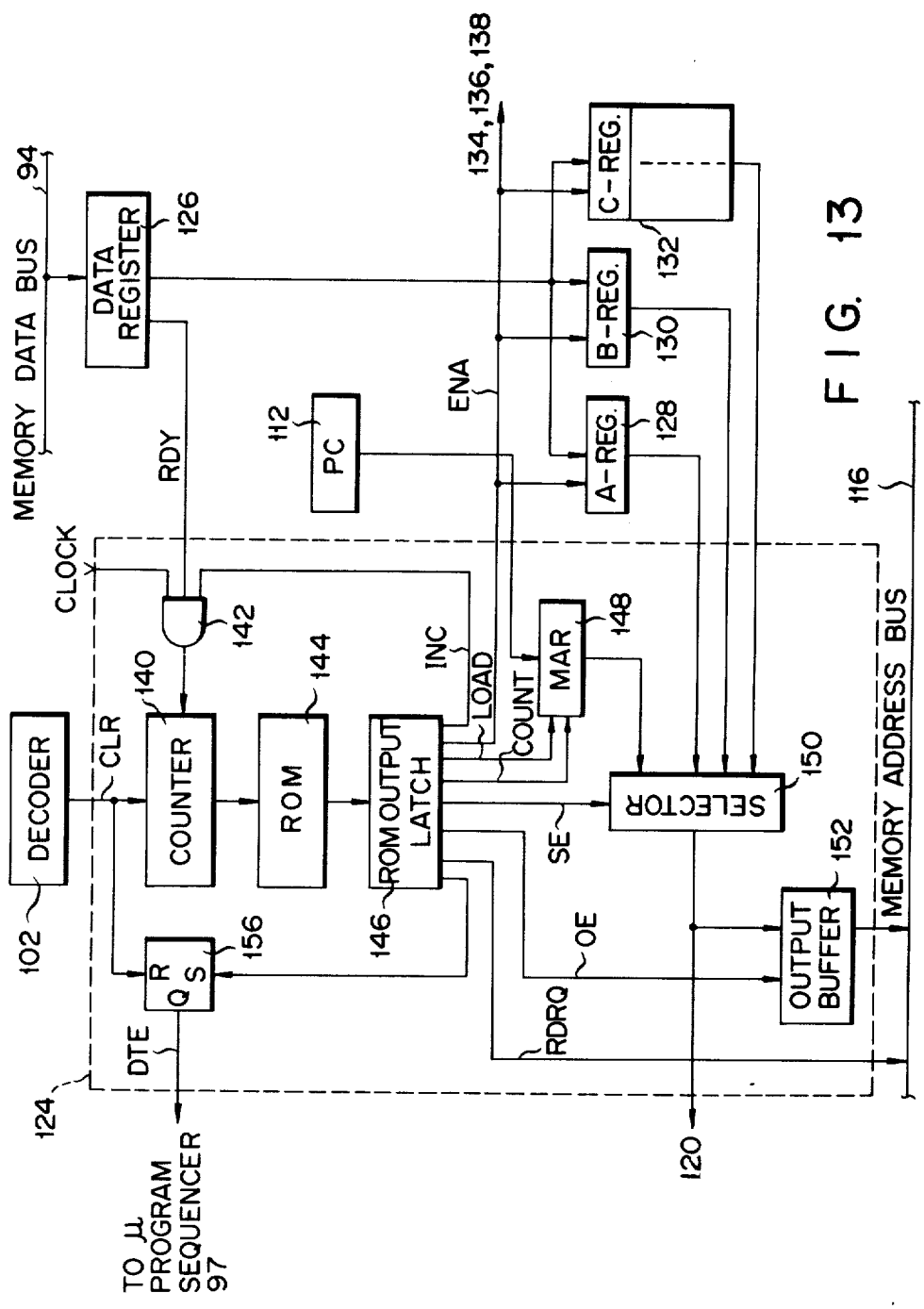
FIG. 13 is a detailed block diagram of the address controller shown in FIG. 8.

When the data is judged to be an ML instruction at the first decoder 102, a clear signal CLR is supplied to a counter 140 of the address/instruction prefetch control circuit shown in FIG. 13. The operation of the counter 140 is controlled by the output of an AND gate 142. The counter 140 functions to specify a particular address of a ROM 144. To the counter 140 are supplied clock signals through the AND gate 142, and the counter 140 is incremented in unitary increments in response to these clock pulses. The ROM 144 is a memory for storing a program for generating various control signals for performing the ML instruction.

The value read out from the ROM 144 is held by a ROM output latch circuit 146 which distributes various control signals. The program stored in the ROM 144 is executed from the 0 address by the function of the counter 140. The execution of the program is interrupted when the reading out of all the operands of the ML instruction is completed. The program is executed in synchronism with the clock signal CLOCK. A memory address register 148 is used for designating the addresses of the first, second, and third operands of the ML instruction using the program counter 112 as a source. A selector 150 functions to switch among the sources for designating the address to be read out from the macroinstruction memory 90, these sources being the memory address register 148, the A register 128, the B register 130, and the C register stack 132. This selection is performed in response to a signal SE. For outputting the readout request to the macroinstruction memory 90, the value of the source selected by the selector 150, that is, the address is sent to the memory address bus 116 through an output buffer 152. Simultaneously with this, a memory readout request signal RDRQ is output. The value sent to the memory address bus 116 is transferred to the address register 92 and the content of the corresponding address of the macroinstruction memory 90 is read out. The readout value is supplied to the memory data bus 94 and is held by the data register 126. Then, a ready signal RDY is sent to the AND gate 142 to enable the counter 140. The ready signal RDY is used for control so that the execution of the program stored in the ROM 144 may not be initiated until the reading out of the program stored in the macroinstruction memory 90 is completed. When the counter 140 is enabled by the ready signal RDY, the content of the counter 140 is incremented in unitary increments by clock signals CLOCK.

The value read out from the macroinstruction memory 90 and held at the data register 126 is stored in the A register 128, the B register 130, or the C register stack 132 by an enable signal ENA output from the ROM output latch circuit 146. Thus, the values of the first, second and third operands of the ML instruction are stored in the respective registers. The values stored in the A register 132, the B register 130, and the C register stack 132 are the address information for the macroinstruction memory 90. The macroinstructions of these addresses are also read out from the macroinstruction memory 90 by the address/instruction prefetch control circuit 124. Reading out the information of the macroinstruction memory 90 designated by the content of the A register 128 is performed in a manner similar to the reading out of the value a of the first operand. By the signal SE, the ROM output latch circuit 146 selects the A register 128 as the source of the selector 150 and enables the output buffer 152 by an output enable signal OE. The circuit 146 simultaneously outputs a memory readout request to the macroinstruction memory 90 by a memory readout request signal RDRQ. Consequently, the content of the A register 128 is supplied to the address register 92 through the memory address bus 116. The value read out from the macroinstruction memory 90 is held in the data register 126 in a manner similar to the case of the reading out described hereinabove. Although not shown in FIG. 13, the value held in the data register 126 is stored in one of te instruction registers 134, 136 and 138 by the enable signal ENA output from the ROM output latch circuit 146. When all of the above operations are completed, an output DTE of a flip-flop 156 becomes "1", indicating that the reading of the operands of the ML instruction is completed.

Readout of the operands of the ML instruction in response to the starting request from the first decoder 102 is performed in a manner described below. The timing of this operation is based on the timing chart shown in FIG. 12.

(1) The content of the program counter 112 is loaded in the memory address register 148.

(2) The data read out from the macroinstruction memory 90 in step (4) is held in the data register 126 according to the executing procedure of the ML instruction described hereinabove.

(3) The value held in the data register 126 is loaded in the A register 128.

(4) The content of the A register 128 is supplied to the memory address bus 116 through the output buffer 152, and a readout request is output to the macroinstruction memory 90.

(5) The content of the memory address register 148 is incremented by 1.

(6) The value (the macroinstruction OP 1) read out from the macroinstruction memory 90 and held in the data register 126 in step (4) is stored in the instruction register 134.

(7) The content of the memory address register 148 is supplied to the memory address bus 116 through the output buffer 152 and a readout request is output to the macroinstruction memory 90.

(8) The value b read out from the macroinstruction memory 90 and held in the data register 126 is stored in the B register 130.

(9) The output of the B register 130 is supplied to the memory address bus 116 and a readout request is output to the macroinstruction memory 90.

(10) The content of the memory address register 148 is incremented by 1.

(11) The value (the macroinstruction OPm) read out from the macroinstruction memory 90 and held in the data register 126 in step (9) is stored in the instruction register 136.

(12) The content of the memory address register 148 is supplied to the memory address bus 116 through the output buffer 152, and a readout request is output to the macroinstruction memory 90.

(13) The value c read out from the macroinstruction memory 90 and held in the data register 126 is stored in the C register stack 132.

(14) The value stored in the C register stack 132 is supplied to the memory address bus 116 through the output buffer 152, and a readout request is output to the macroinstruction memory 90.

(15) The value (the macroinstruction OPn) read out from the macroinstruction memory 90 and held at the data register 126 is stored in the instruction register stack 138.

The BTC and BFC instructions will now be described in more detail. The BTC and BFC instructions are both branch instructions; the branch address is the first operand of the ML instruction or the address represented by the second operand. The difference between them resides in the method of judging the flag represented by the conditions of the mask bit contained in these macroinstructions and the operation result of the ALU. The BTC instruction will be described in this specification.

Figure 14:
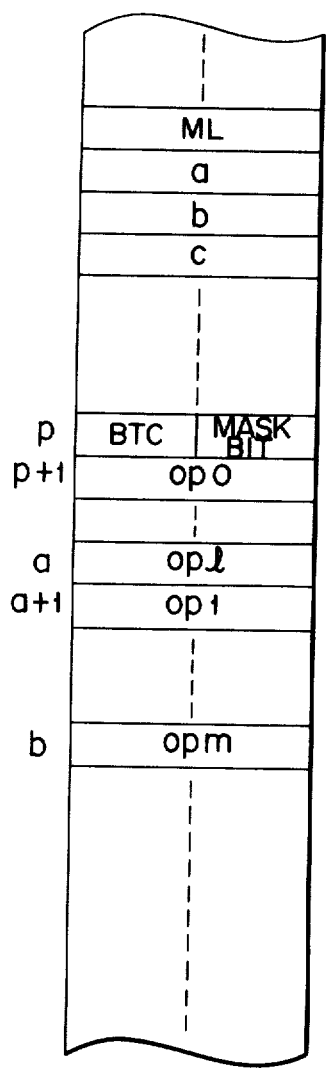
FIG. 14 is a memory map showing the BTC instruction written in the macroinstruction memory.

A description will be made with reference to the operation when the BTC operation is written in the P address of the macroinstruction memory 90 as shown in FIG. 14, referring to the timing charts shown in FIGS. 15a to 15k.

(1) A readout request of the BTC instruction is performed during the execution of the macroinstruction one step before the BTC instruction. That is, the content of the program counter 112 is supplied to the address register 92 through the memory address bus 116, and a memory readout request is output.

(2) The content of the program counter 112 is incremented by 1 by the incrementer 122 and is held in the program counter 112.

(3) The data requested in step (1) is read out from the macroinstruction memory 90 and is loaded in the fetch register 96 through the memory data bus 94. The BTC instruction held in the fetch register 96 is decoded by the decoder 102 and is checked to determine if it is an ML instruction.

(4) The content of the program counter 112 is transferred to the address register 92, and a readout request of a next instruction is output to the macroinstruction memory 90.

(5) The content of the fetch register 96 is transferred to the executing register 100. The content of the executing register 100, that is, the initial address of the microprogram particular to the BTC instruction, is supplied to the microprogram sequencer 106.

(6) The mask bit of the BTC instruction held by the executing register 100 is sent to the ALU. A judgement is made as to the conditions of the flag determined by the executing result of the macroinstruction preceding the BTC instruction. It is further checked if the values of the first, second and third operands of the ML instruction are stored in the A register 128, the B register 130, and the C register stack 132; and the instruction registers 134, 136, and 138 by the ML instruction executed before the current BTC instruction. When they are not stored in these registers due to the busy conditions of the memory address bus 116 or the memory data bus 94, the operation waits at this step until these values are stored. These operations are made by checking the signal DTE sent from the address/instruction prefetch control circuit 124. The following operation is performed when the data has beenm completely stored.

When the judgement result is F=1, the content (value a) of the A register 128 is held in the program counter 112 through the address/instruction prefetch control circuit 124, an internal bus 158, and the selector 120.

(7) The content of the program counter 112 is incremented by 1 and the address next to the macroinstruction of the branch address is designated.

(8) The content of the program counter 112 is transferred to the address register 92, and a readout request of the macroinstruction OP1 is output to the macroinstruction memory 90.

(9) Since the condition judgement result is F=1 in step (6), the content (macroinstruction OP 1) of the instruction register 134 is transferred to the executing register 100 through the selector 98. The content of the executing register 100, that is, the initial address of the microprogram particular to the macroinstruction OP 1, is supplied to the microprogram sequencer 106. The execution of the BTC instruction is thus completed and the execution of the macroinstruction OP 1 is initiated.

The above description refers to the case wherein the judgement result is F=1 in the BTC instruction. When F=0, the operation is the same except that the content of the B register (value b) is transferred to the program counter 112 in step (6), and the content (macroinstruction OPm) of the instruction register 136 is transferred to the executing register 100 in step (9).

Figure 16:
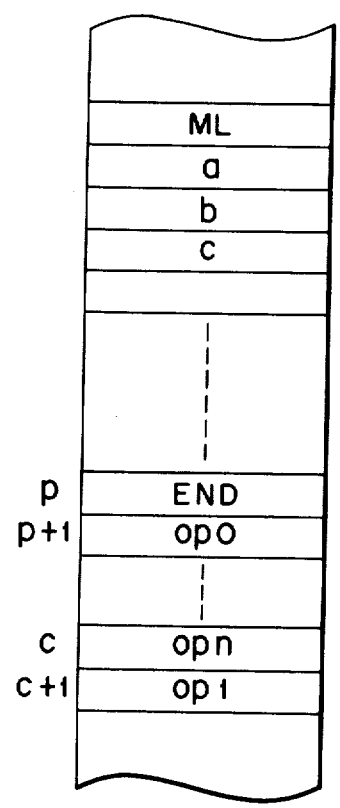
FIG. 16 is a memory map showing the END instruction written in the macroinstruction memory.

The function of the END instruction will now be described. The END instruction is one of the branch instructions and the branch address is the address represented by the third operand of the ML instruction. The mode of operation of the case when the END instruction is written in the address P of the macroinstruction memory 90 as shown in FIG. 16 will be described, referring to the timing chart as shown in FIG. 17.

(1) A readout request of the END instruction is output during the execution of the macroinstruction executed before the END instruction. The content of the program counter 112 is transferred to the address register 92 to initiate a memory readout request.

(2) The content of the program counter 112 is incremented by 1, and is held in the program counter 112 through the selector 120.

(3) The data requested in step (1) is read out from the macroinstruction memory 90 and is loaded in the fetch register 96 through the memory data bus 94. The END instruction held in the fetch register 96 is decoded by the first decoder 102 and is checked to determine if it is an ML instruction.

(4) The content of the program counter 112 is transferred to the address register 92, and a readout request of the next instruction is output.

Although the readout value is held in the fetch register 96 as has been described with reference to the operation of the BTC instruction, it is not used.

(5) The content of the fetch register 96 is transferred to the executing register 100. The content of the executing register 100, that is, the initial address of the microprogram particular to the END instruction, is supplied to the microprogram sequencer 106.

(6) The value obtained by popping up the C register stack 132 by the execution of the END instruction is held in the program counter 112 through the address-/instruction fetch control circuit 124, the internal bus 158, and the selector 120.

(7) The content of the program counter 112 is incremented by 1 to designate the next address C+1 of the macroinstruction OPm of the branch address.

(8) The content of the program counter 112 is transferred to the address register 92 to output a memory readout request to the macroinstruction memory 90.

(9) The value obtained by popping up the instruction register stack 138 is held in the executing register 100 through the selector 98. The content of the executing register 100, that is, the initial address of the microprogram particular to the macroinstruction OPm, is supplied to the microprogram sequencer 106.

The execution of the END instruction is completed and the execution of the macroinstruction OPn is initiated.

What we claim is:

1. A branch guess type central processing unit which judges the conditions of given data to select an instruction to be executed next, and which executes a branch instruction leading to a branch address, comprising:
    (A) first storage means for storing a plurality of macroinstructions including branch-address setting instructions (ML instructions) and respective branch address operands;
    (B) second storage means coupled to said first storage means for storing said respective branch address operands when a branch-address setting instruction (ML instruction) is read out from said first storage means;
    (C) third storage means coupled to said first storage means for storing a plurality of branch address instructions corresponding to respective of said branch-address operands stored in said second storage means;
    (D) decoding means coupled to said first and second storage means for detecting when a branch address setting instruction is read-out from said first storage mean and for generating a control signal based thereon; and
    (E) control means coupled to said decoding means, said second storage means and said third storage means for prefetching in response to said control signal the branch address operands and the corresponding branch address instructions and controlling storing thereof in said second and third storage means, respectively, said control means setting the plurality of branch address operands in said second storage means before execution of the branch instruction in response to said control signal from said decoding means, and setting said plurality of branch address instructions corresponding to said plurality of branch address operands in said third storage means before execution of the branch instruction.

2. A branch guess type central processing unit according to claim 1, wherein said second storage means comprises registers and a pushdown stack.

3. A branch guess type central processing unit according to claim 1, wherein said third storage means comprises registers and a pushdown stack.

4. A branch guess type central processing unit according to claims 1 or 5, wherein said control means comprises:
    (A) a memory for storing a program for generating a control signal to allow execution of an instruction for setting a plurality of addresses corresponding to said judging conditions which are stored in a first group of registers;
    (B) a counter connected to said memory for designating the address of said memory;
    (C) a latch circuit connected to said memory for holding the output from said memory;
    (D) a register for holding an address of an operand of an instruction for setting said plurality of addresses in said first group of registers;
    (E) a selector for receiving an output from said register for designating operands and an output from said first group of registers for storing said branch address and for outputting the received outputs selectively in response to an output signal from said latch circuit; and
    (F) a flip-flop indicating that fetching of operands of an instruction for setting said plurality of addresses in said first group of registers is completed.

5. A branch guess type central processing unit, which judges the conditions of given data to select an instruction to be executed next and executes a branch instruction as well as a branch-address setting instruction (ML instruction) for sequence control, for selecting an address at which said instruction to be executed next is stored, comprising:
    macroinstruction memory means for storing macroinstruction including the branch-address setting instruction and respective branch address operands;
    program counter means coupled to said macroinstruction memory means for designating an address of said macroinstruction memory means;
    fetch register means coupled to said macroinstruction memory means for fetching a macroinstruction output from said macroinstruction memory means;
    first storing means coupled to said macroinstruction memory means for storing said respective branch address operands when the branch-address setting instruction is read out from said macroinstruction memory means;
    second storing means coupled to said macroinstruction memory means for storing a plurality of branch address instructions corresponding to said respective branch address operands stored in said first storing means;
    first decoding means coupled to said macroinstruction memory means and said control means for detecting the branch-address setting instruction and generating a control signal based thereon;
    control means coupled to said first decoding means, said first storing means and said second storing means for prefetching in response to said control signal said branch address operands and said corresponding branch address instructions and controlling storing thereof in said second and third storage means, respectively, said control means setting said plurality of branch address operands in said first storing means before execution of the branch instruction in response to said control signal from sad first decoding means, and setting said plurality of instructions corresponding to said plurality of branch addresses in said second storing means before execution of the branch instruction;

second decoding means coupled to said third storing means for decoding the branch address instructions stored in said third storing means;

microprogram sequencer means coupled to said second decoding means for supplying a read address;

microinstruction memory means coupled to said microprogram sequencer means for outputting a corresponding microinstruction in response to the supplied read address;

microinstruction register means coupled to said microinstruction memory means for holding an instruction output from said microinstruction memory means; and arithmetic and logic unit means (ALU) coupled to said microinstruction register means for performing various arithmetic and logic operations in accordance with the instruction received from said microinstruction register means.

6. A branch guess type central processing unit according to claim 5, wherein said first storing means comprises registers and a pushdown stack.

7. A branch guess type central processing unit according to claim 5, wherein said second storing means comprises registers and a pushdown stack.

8. A branch guess type central processing unit which judges the conditions of given data, proceeds to a specified branch address in accordance with the conditions, and executes a program consisting of a plurality of structured blocks and including macro branch instructions, comprising:

a main memory device for storing a plurality of macroinstructions including a branch-address setting instruction which includes branch addresses in its operand field;

a program counter for designating an address of an instruction to be executed;

a first register for storing an entry address of a first block of said program;

a second register for storing an entry address of a second block of said program;

a first push down stack for storing an entry address of a third block of said program;

a third register for storing a macroinstruction of said main memory device corresponding to the entry address of the first block of said program;

a fourth register for storing a macroinstruction of said main memory device corresponding to the entry address of the second block of said program;

a second push down stack for storing a macroinstruction of said main memory device corresponding to the entry address of the third block of said program;

means for causing said program counter to designate a predetermined address ands for reading a macroinstruction from said main memory device, thereby reading out from said main memory device entry addresses of respective instructions of the contents of said first, second and third blocks of the program;

decoding means for decoding the macroinstruction read from said main memory device and for producing a specified signal when the decoded instruction is the branch-address setting instruction;

means for causing, in response to the specified signal from said decoding means, the storage of said entry addresses to be stored in said first and second registers and in said push down stack, respectively;

means for unloading the contents of the first register and second register and popping up said first push down stack and for storing the contents of said first register, second register and first push down stack in said program counter in sequence; and means for reading out first, second and third predetermined macroinstructions of said first, second and third blocks from the main memory device corresponding to the contents of said first register, second register and first push down stack, and for storing the first, second and third macroinstructions in said third register, fourth register and second push down stack, respectively.

* * * * *